US005734116A

United States Patent [19]

Schaeffer

[11] Patent Number: 5,734,116

[45] Date of Patent: Mar. 31, 1998

[54] NEMA CABINET MONITOR TESTER

[75] Inventor: David B. Schaeffer, Spencer, Iowa

[73] Assignee: General Traffic Controls, Spencer, Iowa

[21] Appl. No.: 681,659

[22] Filed: Jul. 29, 1996

[51] Int. Cl.$^6$ .................................................... G01N 19/00

[52] U.S. Cl. .................... 73/865.6; 073/1.01; 073/865.9; 340/931

[58] Field of Search .................................... 73/1 R, 865.6, 73/101, 865.9; 340/931, 907, 515

[56] References Cited

U.S. PATENT DOCUMENTS

| | | | |
|---|---|---|---|
| 3,902,156 | 8/1975 | Hill | 340/931 |
| 4,586,041 | 4/1986 | Carlson | 340/931 |
| 4,835,534 | 5/1989 | Lucas | 340/931 |
| 5,220,321 | 6/1993 | Sauer | 340/931 |
| 5,327,123 | 7/1994 | Heimann et al. | 340/931 |

OTHER PUBLICATIONS

Procedures for manual monitor testers, Crouse–hinds, Syracuse, New York, Dec.1979.

*Primary Examiner*—Hezron E. Williams
*Assistant Examiner*—Nashmiya Ashraf
*Attorney, Agent, or Firm*—Zarley, McKee, Thomte, Voorhees, & Sease

[57] ABSTRACT

An apparatus and method for testing a conflict monitor of the present invention includes a housing having a plurality of switches which can be manually manipulated in order to simulate the output of a controller. The conflict monitor is tested by disconnecting the traffic signal controller from the wiring harnesses and connecting the same harnesses to the test unit. The technician can then manipulate the switches in order to control the traffic signals and simulate the operation of the controller. When conflicting traffic signals are activated, the conflict monitor should punch out and put the traffic signals in a flashing state. The test unit includes a reset switch which is connected to the remote reset of the conflict monitor. After the conflict monitor punches out, the technician can simply press the reset button on the test unit without having to manually reset the conflict monitor.

17 Claims, 5 Drawing Sheets

NEMA CABINET MONITOR TESTER

BACKGROUND OF THE INVENTION

1. Field of the Invention

The present invention relates to NEMA cabinet monitor testers. More particularly, though not exclusively, the present invention relates to an apparatus and method for testing NEMA traffic control cabinets and conflict monitors.

2. Problems in the Art

At every signalized traffic intersection there is a traffic signal control cabinet. The traffic signal control cabinet houses various equipment which controls the traffic signals at the intersection. A typical NEMA traffic signal control cabinet houses a terminal panel including load switches and a flasher. Also found in the control cabinet are a controller and conflict monitor. The controller is a sophisticated device which controls the operation of traffic signals at the intersection. The conflict monitor is also a sophisticated device which monitors the operation of the controller and traffic signals to prevent hazardous conditions, such as two conflicting green lights being activated at the same time. If the conflict monitor detects a fault, the conflict monitor activates the flasher which automatically places the traffic signals in a flashing mode.

FIG. 1 is a diagram of a typical traffic intersection. In the field of traffic signal controls, traffic movements are designated by a phase number or overlap letter. The arrows shown in FIG. 1 each represent a traffic movement. The intersection shown in FIG. 1 is an eight phase traffic intersection. Phase 1 is the northbound left turn traffic movement. Phase 2 is the southbound straight traffic movement. Phase 3 is the eastbound left turn traffic movement. Phase 4 is the westbound straight traffic movement. Phase 5 is the southbound left turn traffic movement. Phase 6 is the northbound straight traffic movement. Phase 7 is the westbound left turn traffic movement. Phase 8 is the eastbound straight traffic movement. Also shown in FIG. 1 are four overlaps. The westbound right turn is overlap A. The eastbound right turn is overlap B. The northbound right turn is overlap C. The southbound right turn is overlap D. FIG. 1 also shows the phase 2, phase 4, phase 8, and phase 6 walks. For a given traffic movement, there may be one or more conflicting traffic movements.

It is the function of the conflict monitor to prevent two or more conflicting traffic movements from occurring at the same time. For example, Phase 1 is a conflicting movement with Phase 8, Phase 3, Phase 2, Phase 4, and Phase 7, since a Phase 1 traffic movement with any of the other listed traffic movements could cause a collision. In contrast, the movements that are not in conflict with Phase 1 are Phase 6, Phase 5 and overlaps A, B and C. Conflicts with the other combinations of traffic movements shown in FIG. 1 can be easily seen in FIG. 1. If the conflict monitor is working properly, and the Phase 1 (northbound left turn) light is green and at the same time the Phase 8 (eastbound straight) light is green, the conflict monitor should "punch out" and cause a flashing red or yellow light at all phases. Similarly, the conflict monitor will also detect conflicts from any other conflicting traffic movement indication.

It is critical to the safety of the public that conflict monitors be kept in top working order. There are two prior art methods of testing a conflict monitor. First, the conflict monitor can be bench tested by connecting the monitor to an analyzer and observing the results in a lab. This type of test is done in the shop and not in the field. These analyzers are very expensive and may range in price up to $6,000. An example of such an analyzer is the model PCMT2000 PC-Based Cabinet Monitor Tester, manufactured by Athens Technical Specialists, Inc. of Athens, Ohio.

One problem with the bench analyzer test is that only the conflict monitor is tested. The bench analyzer does not test the cabinet assembly, wiring, etc. There is always a possibility that an operable conflict monitor is installed in a faulty cabinet. In such a case, the bench analyzer would not detect a fault condition.

A second type of testing involves cabinet level testing as part of a maintenance program. Cabinet level testing is very difficult and laborious. Due to the difficulty and danger of cabinet level testing, many cities do not perform these tests on a regular basis.

Cabinet level testing is typically performed as follows. With all of the equipment in the traffic signal control cabinet installed and operating stop time in an all-RED interval, a jumper wire is connected from 120 volts AC to the field terminal of the channel to be tested, for example channel 1 green (i.e., the phase 1 green light). The field terminals are terminals in the cabinet which are electrically connected to various traffic lights such that when the appropriate voltage is applied to a particular field terminal, the traffic light corresponding to that terminal will be illuminated. A second jumper is connected to 120 volts AC at one end and is momentary applied to each field terminal of all the remaining used channels while the first jumper remains in place, for example, starting with channel 2 walk, channel 2 green, channel 2 yellow, then channel 3 walk, etc. In this way, with one channel activated by the first jumper, the technician can observe the conflict monitor to see if the conflict monitor detects faults at the appropriate time.

This procedure is repeated by reconnecting the first jumper wire from 120 volts AC to the next indication terminal and in turn testing all combinations by momentary applying the second jumper to each of the remaining indication terminals. The first jumper is then moved to the next terminal and the process is again repeated until all combinations of any two indications between any two channels are checked. During this process, whenever the conflict monitor "punches out" after detecting a fault, the technician must manually press the reset button on the conflict monitor before proceeding.

As can be seen, this process is very difficult and lengthy. In addition, the process is very hazardous since the technician is handling "hot" wires with a loose end. In addition, depending on the particular control cabinet in the field, the indication terminals are sometimes difficult to access without lying on the ground or bending over. In addition, during the entire testing process, a person trained in directing traffic must stand in the street and direct traffic since the traffic lights will not be operating in a consistent and safe manner during the testing. These problems in combination with adverse weather, dirt, traffic, etc., compound the difficulty and frustration. As a result, many cities are living with increased liability exposure due to failure to conduct the appropriate testing procedures.

OBJECTS OF THE INVENTION

A general object of the present invention is the provision of an apparatus and method for testing conflict monitors which overcomes the deficiencies found in the prior art.

A further feature of the present invention is the provision of an apparatus and method for testing conflict monitors which uses a portable testing unit which is connected to the terminal panel to control the operation of the traffic signals in order to test the conflict monitor.

Further features, objects and advantages of the present invention include:

An apparatus and method for testing conflict monitors which allows a technician to quickly, easily, and safely test conflict monitors and their related components in the field.

An apparatus and method for testing conflict monitors which uses a switching system to activate desired signals without manually connecting jumpers in the traffic signal control cabinet.

These as well as other objects, features and advantages of the present invention will become apparent from the following specification and claims.

SUMMARY OF THE INVENTION

The present invention relates to a method and device for testing a conflict monitor which is used in a NEMA cabinet which controls the operation of the traffic signals in an intersection. A NEMA cabinet monitor tester is connected to the terminal panel of the traffic signal control cabinet. A number of switching elements on the tester are used to simulate the outputs of a controller in order to test the operation of the conflict monitor.

The tester may be connected to the terminal panel using the same wiring harnesses that connect the controller to the terminal panel. The present invention allows a technician to test the operation of the conflict monitor in the traffic signal control cabinet without the need for taking the conflict monitor to a lab.

DETAILED DESCRIPTION OF THE PREFERRED EMBODIMENT

The present invention will be described as it applies to its preferred embodiment. It is not intended that the present invention be limited to the described embodiment. It is intended that the invention cover all alternatives, modifications, and equivalences which may be included within the spirit and scope of the invention.

As discussed above, FIG. 1 shows a typical eight phase traffic intersection. A typical eight phase traffic intersection such as that of FIG. 1 will have, for each direction of traffic, a set of RED, YELLOW, and GREEN signal lights including left turn and right turn signal lights. In addition, intersections may include WALK and DON'T WALK signals (not shown).

Figure 1:
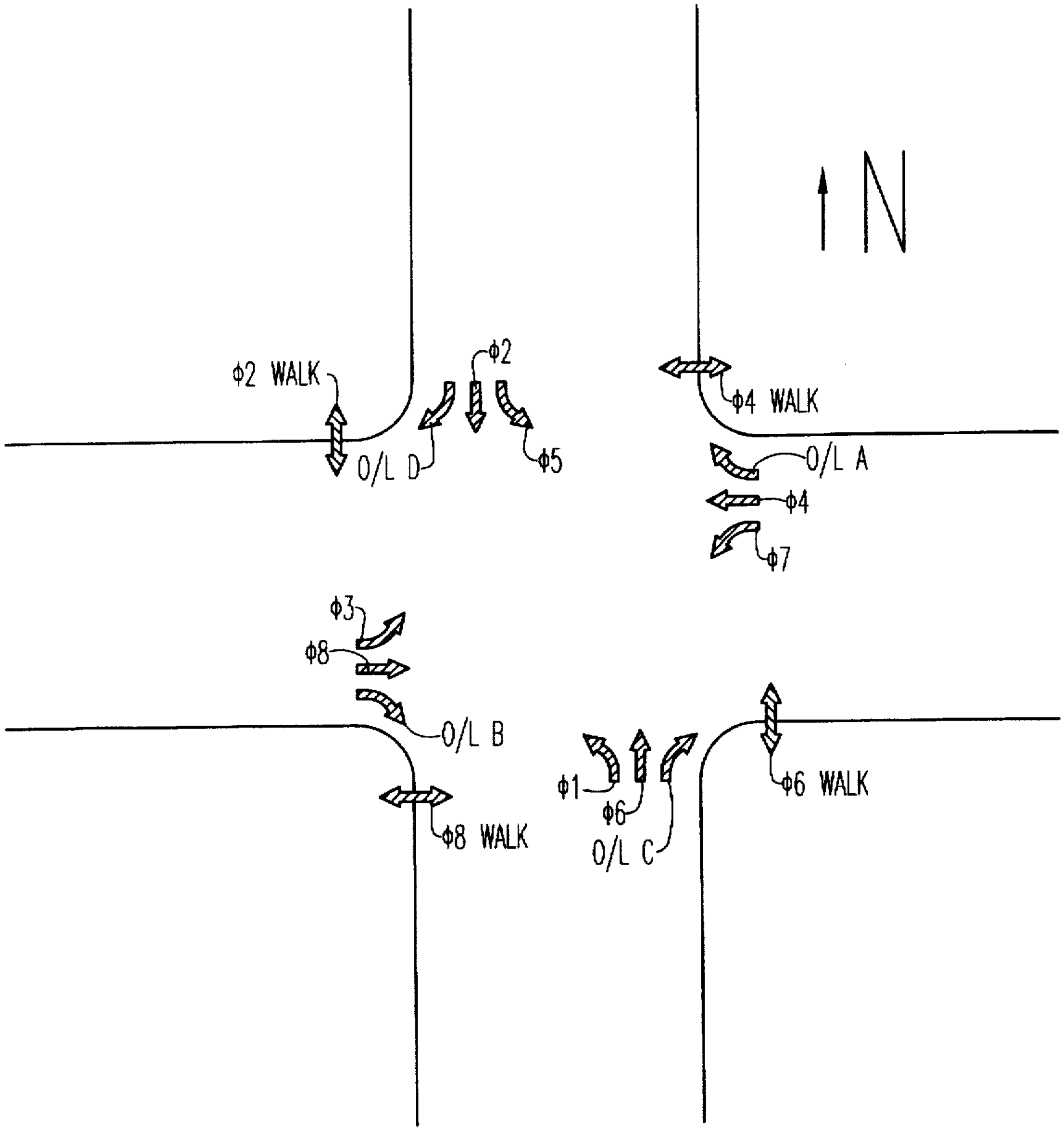
FIG. 1 is a diagram showing an eight phase traffic intersection and the resulting traffic movements.
Figure 2:
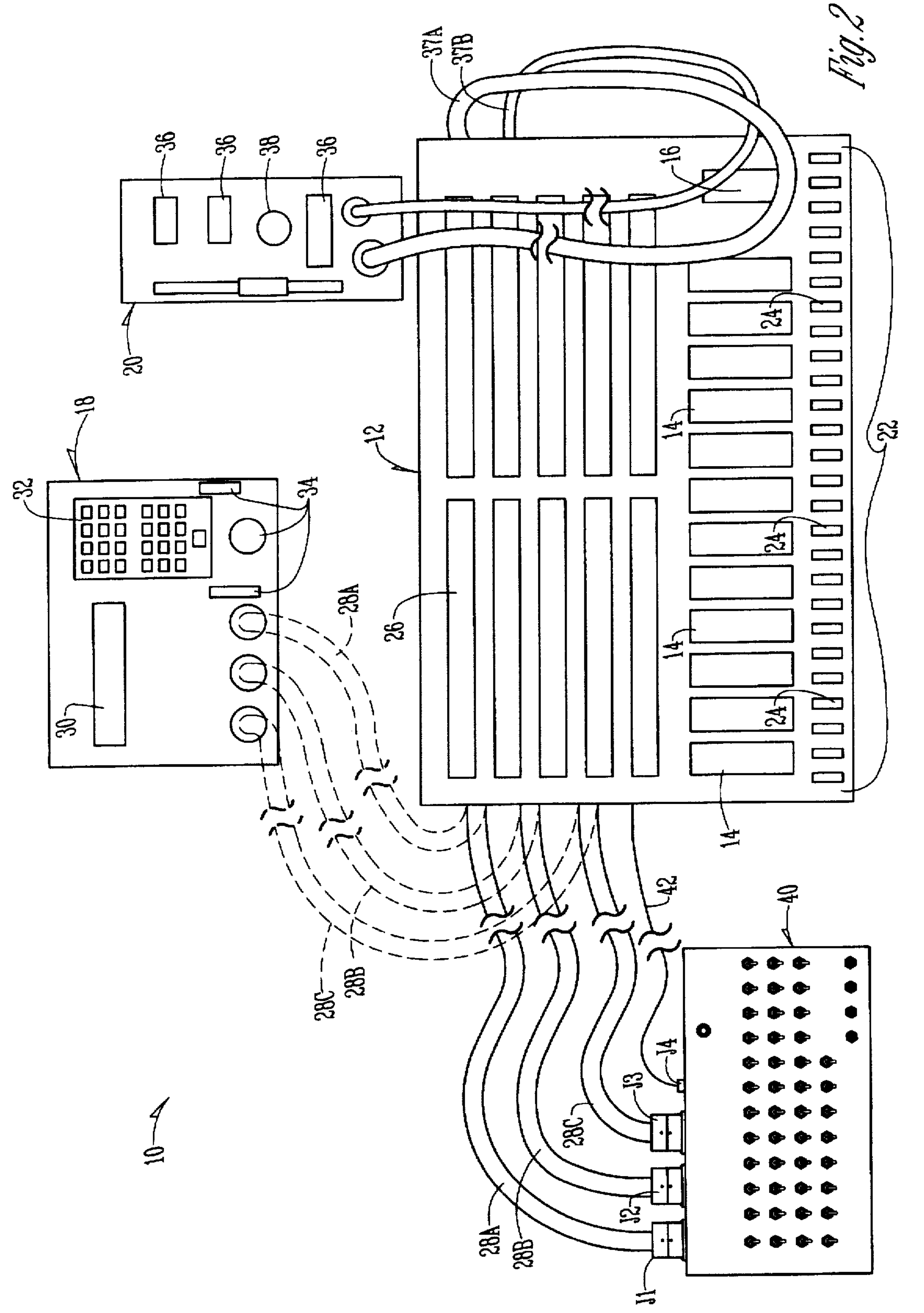
FIG. 2 is a front view of the interior of a traffic signal control cabinet with the test unit of the present invention.

FIG. 2 shows the interior of a traffic signal control cabinet 10 which is typically used to control the traffic signals at a traffic intersection such as that shown in FIG. 1. The cabinet includes a terminal panel 12 which supports many components including load switches 14 and a flasher unit 16. The load switches 14 are solid state relays that deliver high current to the signal lamps upon the appropriate command from a traffic signal controller 18. At the end of the row of load switches 14 is a flasher 16 which is a solid state device that is in a standby mode most of the time. The flasher comes into play when the technician places the traffic signals in a "flash" mode by a manual switch in the cabinet 10 or when the conflict monitor 20 detects a fault and automatically places the signals in the flash mode.

The traffic signal bulbs have circuits which are connected to the cabinet through underground field cables (not shown). The underground field cables are connected to a terminal strip 22 across the bottom of the main terminal panel 12. The terminal strip 22 includes a number of field terminals 24, each corresponding to a lamp in one of the traffic signals.

The traffic signal controller 18 is a sophisticated device using microprocessor technology. The controller 18 is connected to the terminal panel 12 by three cables 28A, 28B and 28C. The cables plug into three plugs on the front of the controller 18 which are configured to meet industry standards developed by NEMA (National Electrical Manufactures Association). The type of connector and pin out designations developed by NEMA are uniform throughout the industry to facilitate interchangeability between different brands of controllers. The controller 18 shown in FIG. 2 includes a display 30 which is an alpha numeric LCD display that shows the actual running conditions of the traffic signals. The controller 18 also includes a keypad 32 which allows for the efficient data entry for timing and other parameters. The specific controller 18 shown in FIG. 2 is shown as an example of many possible controllers. There are a large number of types of controllers which may or may not include displays or keypads.

The conflict monitor 20 is located near the controller 18 in the traffic signal control cabinet 10. The conflict monitor 20 is a sophisticated device using microprocessor technology. The conflict monitor 20 also conforms to NEMA standards. As discussed above, the purpose of the conflict monitor 20 is to prevent traffic signal indications of conflicting traffic movements from being illuminated simultaneously to prevent hazardous conditions from occurring. One such hazardous condition would the activation of two green lights at the same time for conflicting traffic movements, for example, phase 6 and phase 4 in FIG. 1.

The conflict monitor 20 is connected to the terminal panel 12 by cables 37A and 37B. The cables 37A and 37B provide an input hardwired directly to the field terminals 24 for each RED, YELLOW, GREEN and WALK circuit at the traffic intersection. A typical cabinet 10 will include from six to more than forty such circuits. The conflict monitor 20 also includes a reset button 38 which is used by a technician to reset the conflict monitor after the conflict monitor has set the traffic signals in the flash mode.

Figure 3:
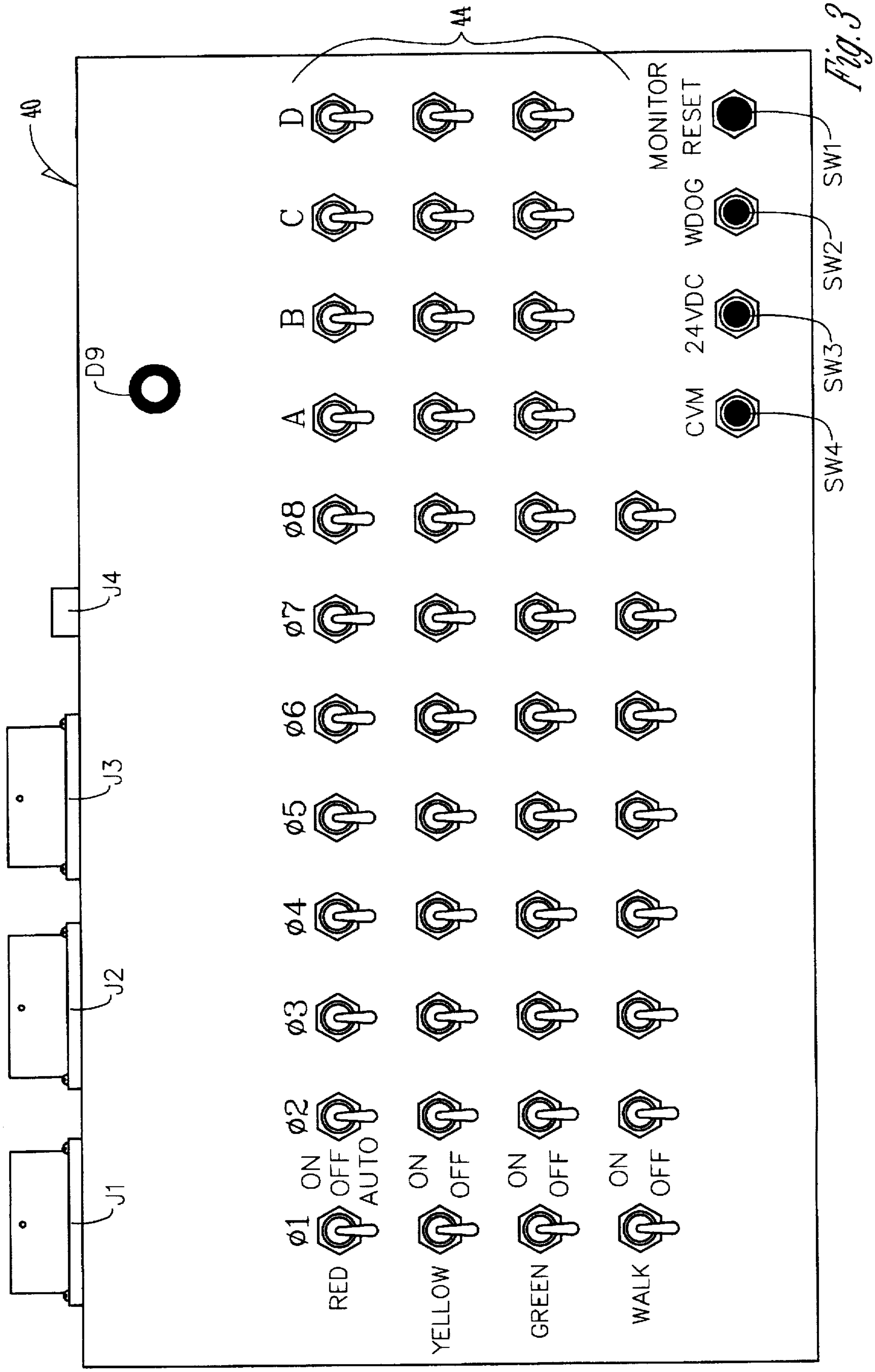
FIG. 3 is a top view of the test unit shown in FIG. 2.

Also shown in FIG. 2 is a NEMA cabinet monitor tester 40 of the present invention. The NEMA cabinet monitor tester 40 is used to test the conflict monitor 20 as well as the connections in the terminal panel 12. The tester 40 is connected to the terminal panel 12 by the cables 28A, 28B, and 28C which were also used to connect the terminal panel 12 to the controller 18. The cables 28A, 28B, and 28C are each connected to jacks J1, J2 and J3, respectively. A fourth jack J4 is connected to a wire 42 which is connected to the monitor reset terminal on the back panel 12. The tester 40 has a main function of simulating the signal outputs which are normally generated by the controller 18. This is accomplished manually using a number of toggle switches 44 (FIG. 3). As shown in FIG. 3, forty-four toggle switches are included with the tester 40. Of course, the present invention could use any number of toggles switches 44 depending on the desired use of the tester 40. Also, other types switching elements may be used in place of the toggle switches 44. In addition, a number of transistors or other semiconductor devices could control the outputs of the tester 40. As shown in FIG. 3, there are twelve columns and four rows of toggle switches 44. Each column relates to a phase or an overlap (Phase 1 through Phase 8 and overlap A through overlap D). For Phases 1 through Phases 8, there are four rows of toggle switches 44 corresponding to RED, YELLOW, GREEN and WALK lights. For the overlaps A through D, there are three rows of toggle switches 44 corresponding to RED, YELLOW, and GREEN lights. Preferably, the toggle switches 44 are high quality and durable toggle switches.

Figure 4:
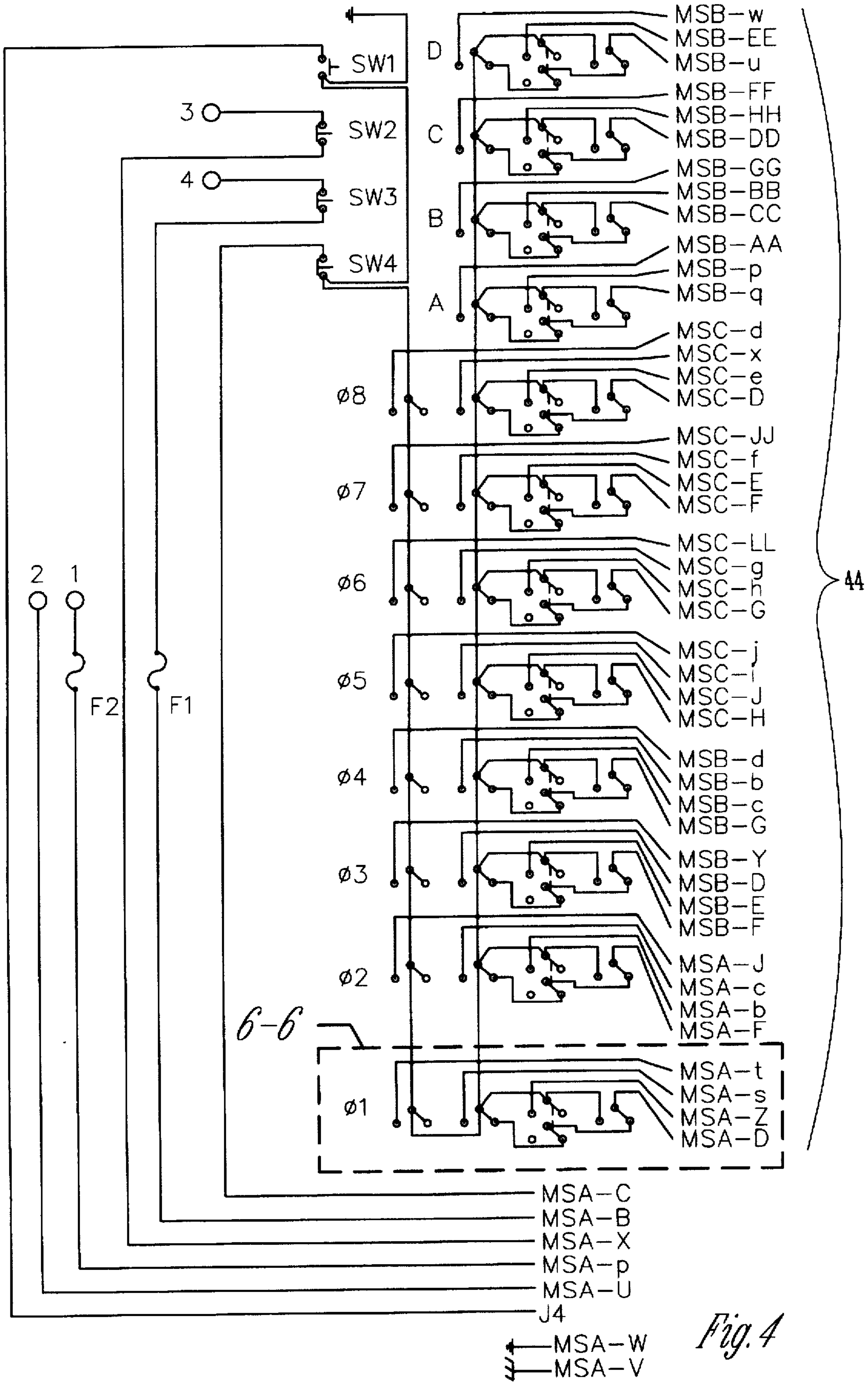
FIGS. 4 and 5 are electrical schematic diagrams of the test unit of the present invention.
Figure 5:
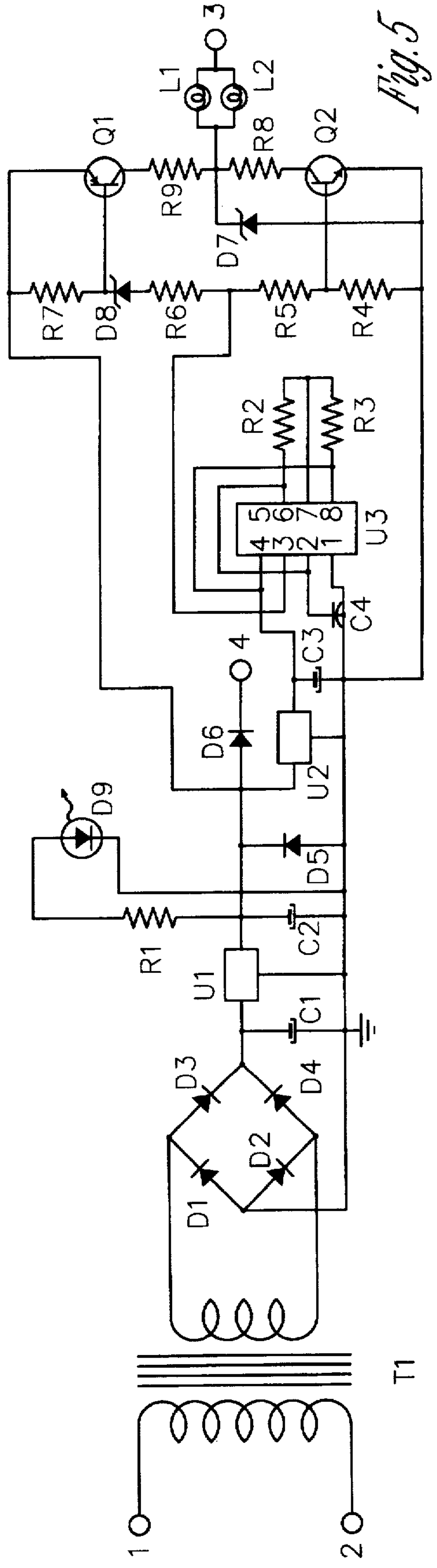

FIGS. 4 and 5 are electrical schematic diagrams of the tester 40 shown in FIG. 3. FIG. 4 shows the toggle switches 44 as well as switches SW1, SW2, SW3, and SW4. Also shown in FIG. 4 are the NEMA pin designations for all the connections from the tester 40 to the panel 12. Table 1 is a table showing the pin designations of all the connection points of FIG. 4 as well as their relation to jacks J1, J2, J3 and J4 (FIGS. 2 and 3). FIG. 5 is a schematic diagram including a 24 volt DC power supply and a square wave generator. Since the conflict monitor 20 is capable of verifying certain voltages generated by the controller 18, the tester 40 includes the power supply and square wave generator. A transformer T1 is shown with a connection made to an AC+ and AC− input via the NEMA plugs MSA-p and MSA-U respectively. The secondary side of the transformer T1 is connected to a full wave bridge rectifier comprised of diodes D1 through D4. The resulting DC voltage is used by the voltage regulator U1 to produce a 24 volt DC voltage source at connection point 4. The LED D9 (FIGS. 3 and 5) indicates the presence of 24 volts DC. Connection point 4 is in turn connected to switch SW3 (FIG. 4). A 555 timer U3 is used, along with the appropriate components, to generate a 1 Hz square wave voltage at connection point 3. Connection point 3 is connected to switch SW2 (FIG. 4).

Figure 6:
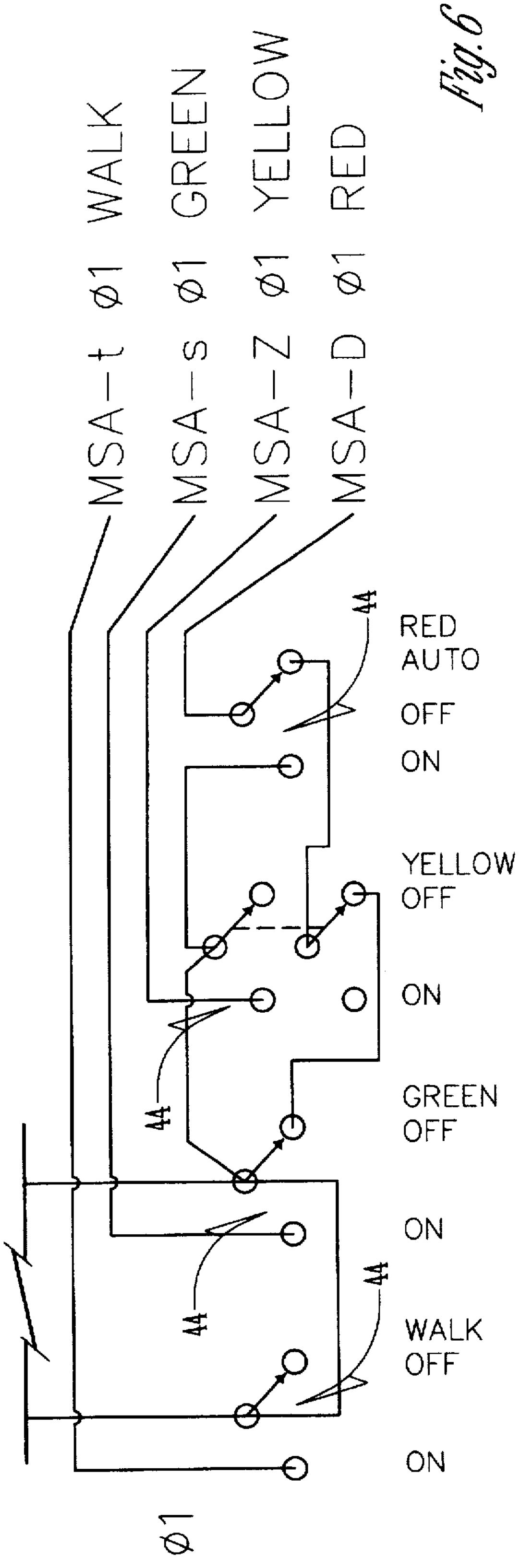
FIG. 6 is an enlarged view of a portion of the electrical schematic taken from lines 6—6 of FIG. 4.

FIG. 6 is an enlarged view of the circuitry shown in FIG. 4 corresponding to Phase 1. As shown in FIG. 6, four toggle switches 44 are shown relating to Phase 1 RED, YELLOW, GREEN and WALK. The remaining switches shown in FIG. 4 are configured in a similar manner and connected where indicated in Table 1.

The testing unit 40 is enclosed in a grounded housing. The AC input and DC output are fused by fuses F2 and Fl.

The testing unit 40 is designed to test the conflict monitor 20 in the field, rather than in a lab. The testing of the conflict monitor 20 within the traffic signal control cabinet 10 provides an undisturbed conflict monitor 20 tested under actual working conditions. At the same time, the controller cables 28A, 28B, 28C, terminal panel 12, load switches 14, flasher 16, monitor cables 37A and 37B, terminal strip 22 and the field wiring can also be verified for proper operation.

The tester 40 includes a monitor reset switch SW1 which is connected to the monitor reset terminal on the back panel 12. By pressing the monitor reset switch SW1 after the conflict monitor has punched out, the conflict monitor will reset without the technician having to reach to press the reset button 38 on the conflict monitor 20. This saves the technician a considerable amount of time while going through a testing procedure.

A typical testing scenario is as follows. First, a technician must disconnect cables 28A, 28B and 28C from the controller 18. The cables 28A through 28C are then connected to jacks J1, J2, and J3 of the tester 40. The wire 42 is plugged into jack J4 to connect the test unit 40 to the monitor reset terminal on the back panel 12.

To begin testing, all of the toggle switches 44 are placed in a down position as shown in FIG. 3. At this point, all of the signal light indications in the intersection of the street should be red.

The tester 40 is capable of checking the ability of the conflict monitor 20 to detect the following conditions which are described below: conflict/compatibility; RED failure; CVM failure; 24 volt failure; minimum clearance; watchdog; GREEN or WALK versus YELLOW; and GREEN, WALK or YELLOW versus RED.

The primary condition that the tester 40 is designed to test is the conflict/compatibility testing which is described above in the context of manual testing. The conflict/compatibility is tested using the tester 40 by switching on a used green (using the appropriate toggle switches 44) and switching on all the other used green, yellow and walk outputs one at a time. If the other channels are incompatible, the technician should observe the conflict indication on the conflict monitor 20. If the conflict monitor 20 indicates a conflict where appropriate and "punches out," resulting in flashing signal lights, the conflict monitor is operating correctly. After each time that the conflict monitor punches out after detecting a conflict, the reset button SW1 can be pressed to reset the conflict monitor 20 in order to repeat the test for each used channel. This procedure is used for every used channel to check for every possible conflict that could occur.

The RED failure is tested by switching the RED switch to the center (off) position on each used channel (Phase 1 through Phase 8 and overlap A through overlap D). The switch is then returned to the down (auto) position after each test. The top row of toggle switches 44 on the tester 40 are three-position (ON-OFF-AUTO) switches. In the AUTO position, the red indication will extinguish when green or yellow is switched on for the same channel.

The Controller Voltage Monitor (CVM) failure is tested by depressing the CVM push button switch SW4 and observing the failure indication on the conflict monitor 20. If a controller determines that something is not operating correctly, the controller will generate a CVM signal. The conflict monitor 20 should cause traffic signals to flash if it detects the CVM signal. So, when the CVM switch SW4 on the tester 40 is pressed, the traffic lights should go into a flashing state. When the CVM switch SW4 is pressed, logic ground is disconnected from the circuit.

The conflict monitor 20 normally monitors the 24 volts from the controller 18. The 24 volt failure is tested by pressing the 24 VDC push button SW3 on the tester 40 and observing the failure indication on the conflict monitor 20. The 24 VDC switch disconnects 24 volts dc from the circuit when pressed.

The minimum clearance is tested by switching on a used GREEN toggle switch 44 and then switching it off. If minimum clearance is enabled, the conflict monitor 20 should indicate a failure. The minimum clearance relates to the timing between the transition from green and yellow signals. A minimum 2.7 second yellow signal must follow a green signal.

The watchdog failure is tested by depressing and holding the watchdog push button switch SW3. If watchdog is enabled, the conflict monitor 20 should indicate a failure. The watchdog switch SW2 normally sends a 1 Hz square wave output (a flashing logic output) to the conflict monitor 20. This indicates to the conflict monitor 20 that the controller 18 is operating. Therefore, by pressing and holding switch SW2, the square wave is disconnected and the conflict monitor 20 should sense that the controller 18 is down and indicate a failure and go to flash.

GREEN or WALK versus YELLOW is tested by switching on a used YELLOW output and a GREEN or WALK on the same channel. If GREEN or WALK versus YELLOW is enabled, the conflict monitor 20 should indicate a failure and punch out when the YELLOW and either the GREEN or WALK are turned on for a given channel.

The GREEN, WALK or YELLOW versus RED condition is tested by switching a used RED channel on (up position) and a GREEN, WALK or YELLOW on the same channel. If GREEN, WALK or YELLOW versus RED is enabled, the conflict monitor 20 should indicate a failure and punch out when the RED and either the GREEN, WALK or YELLOW are turned on for a given channel.

The entire testing procedure using the tester 40 of the present invention can be completed in just several minutes since the technician will not have to continually disconnect jumpers while observing the conflict monitor and manually resetting the conflict monitor.

The conflict monitor tester 40 of the present invention could take on many different forms. For example, the tester 40 could be automated by providing a processor which automatically goes through any given test procedure. Such a tester could also be programmable in order to customize automated testing or otherwise enhance its functions.

Table 2 lists the values or part numbers of the components shown in the embodiment shown in FIGS. 3. Of course, other components could be used within the scope of the invention.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

TABLE 1

| PHASE | CONNECTOR | NEMA PLUG | PIN DESIGNATION |
|---|---|---|---|
| O/L D | J2 | MSB-w | O/L-D Green |
| O/L D | J2 | MSB-EE | O/L-D Yellow |
| O/L D | J2 | MSB-u | O/L-D Red |
| O/L C | J2 | MSB-FF | O/L-C Green |
| O/L C | J2 | MSB-HH | O/L-C Yellow |
| O/L C | J2 | MSB-DD | O/L-C Red |
| O/L B | J2 | MSB-GG | O/L-B Green |
| O/L B | J2 | MSB-BB | O/L-B Yellow |
| O/L B | J2 | MSB-CC | O/L-B Red |
| O/L A | J2 | MSB-AA | O/L-A Green |
| O/L A | J2 | MSB-p | O/L-A Yellow |
| O/L A | J2 | MSB-q | O/L-A Red |
| ø8 | J3 | MSC-d | ø8 Walk |
| ø8 | J3 | MSC-x | ø8 Green |
| ø8 | J3 | MSC-e | ø8 Yellow |
| ø8 | J3 | MSC-D | ø8 Red |
| ø7 | J3 | MSC-JJ | ø7 Walk |
| ø7 | J3 | MSC-f | ø7 Green |
| ø7 | J3 | MSC-E | ø7 Yellow |
| ø7 | J3 | MSC-F | ø7 Red |
| ø6 | J3 | MSC-LL | ø6 Walk |
| ø6 | J3 | MSC-g | ø6 Green |
| ø6 | J3 | MSC-h | ø6 Yellow |
| ø6 | J3 | MSC-G | ø6 Red |
| ø5 | J3 | MSC-j | ø5 Walk |
| ø5 | J3 | MSC-i | ø5 Green |
| ø5 | J3 | MSC-J | ø5 Yellow |
| ø5 | J3 | MSC-H | ø5 Red |
| ø4 | J2 | MSB-d | ø4 Walk |

TABLE 1-continued

| PHASE | CONNECTOR | NEMA PLUG | PIN DESIGNATION |
|---|---|---|---|
| ø4 | J2 | MSB-b | ø4 Green |
| ø4 | J2 | MSB-c | ø4 Yellow |
| ø4 | J2 | MSB-G | ø4 Red |
| ø3 | J2 | MSB-Y | ø3 Walk |
| ø3 | J2 | MSB-D | ø3 Green |
| ø3 | J2 | MSB-E | ø3 Yellow |
| ø3 | J2 | MSB-F | ø3 Red |
| ø3 | J1 | MSA-J | ø2 Walk |
| ø2 | J1 | MSA-c | ø2 Green |
| ø2 | J1 | MSA-b | ø2 Yellow |
| ø2 | J1 | MSA-F | ø2 Red |
| ø1 | J1 | MSA-t | ø1 walk |
| ø1 | J1 | MSA-s | ø1 Green |
| ø1 | J1 | MSA-Z | ø1 Yellow |
| ø1 | J1 | MSA-D | ø1 Red |
| N/A | J1 | MSA-C | CVM output |
| N/A | J1 | MSA-B | 24VDC output |
| N/A | J1 | MSA-X | Flasbing logic output |
| N/A | J1 | MSA-p | AC+ Input |
| N/A | J1 | MSA-U | AC− Input |
| N/A | J4 | N/A | Remote Monitor Reset |
| N/A | J1 | MSA-W | Logic Ground |
| N/A | J1 | MSA-V | Earth Ground |

TABLE 2

| ITEM | DESCRIPTION | VALUE or PART NUMBER |
|---|---|---|
| R1 | Resistor | 1.8K |
| R2 | Resistor | 5.6M |
| R3 | Resistor | 820K |
| R4 | Resistor | 270 |
| R5 | Resistor | 1K |
| R6 | Resistor | 1K |
| R7 | Resistor | 270 |
| R8 | Resistor | 100 |
| R9 | Resistor | 100 |
| C1 | Capacitor | 2200 uf |
| C2 | Capacitor | 470 uf |
| C3 | Capacitor | 47 uf |
| C4 | Capacitor | 15 uf |
| D1 | Diode | 1N4007 |
| D2 | Diode | 1N4007 |
| D3 | Diode | 1N4007 |
| D4 | Diode | 1N4007 |
| D5 | Diode | 1N4007 |
| D6 | Diode | 1N4007 |
| D7 | 24 Volt Zener Diode | 5081 |
| D8 | 18 Volt Zener Diode | 5077 |
| D9 | Red LED | LN28RP |
| Q1 | Transistor | TIP32 |
| Q2 | Transistor | TIP31 |
| L1 | Lamps | 1819 |
| L2 | Lamps | 1819 |
| U1 | 24 Volt Positive Regulator | 7824 |
| U2 | 12 Volt Positive Regulator | 7812 |
| U3 | Timer | 555 |
| T1 | Transformer | 120 VAC IN/25.2 VAC OUT |
| F1 | 1 Amp Fuse | AGC1 |
| F2 | 1 Amp Fuse | AGC1 |

What is claimed is:

1. A device for testing components of a traffic control cabinet including a conflict monitor, a terminal panel having load switches and a flasher, controller cables, conflict monitor cables, a terminal strip, and field wiring which are all used in a traffic signal control cabinet for controlling the operation of a plurality of traffic signals in an intersection, the device comprising:

a housing;

at least one connector for connecting the device to the terminal panel of the traffic control cabinet in place of the controller; and a plurality of switches for selectively controlling the operation of the plurality of traffic signals, wherein the traffic signals can be controlled by the device while the conflict monitor is operating in order to simultaneously observe and verify the operation of the conflict monitor and the other components of the traffic control cabinet while controlling the operation of the traffic signals.

2. The device of claim 1 wherein the terminal panel includes a plurality of wiring harnesses used to connect the controller to the terminal panel, and wherein the at least one connector is connectable to the plurality of wiring harnesses in order to connect the device to the terminal panel.

3. The device of claim 2 wherein the at least one connector is comprised of three connectors.

4. The device of claim 3 wherein the three connectors are configured to meet NEMA standards.

5. The device of claim 1 further comprising a square wave generator for generating a square wave to simulate a flashing logic output of the controller.

6. The device of claim 5 further comprising a switch connected in series between the square wave generator and the connector for selectively disconnecting the square wave generator from the connector.

7. The device of claim 6 wherein the conflict monitor is connected to the square wave generator through the connector such that the conflict monitor is able to monitor the simulated flashing logic output, wherein the switch can be used to test the conflict monitor's ability to monitor the flashing logic output.

8. The device of claim 1 wherein the conflict monitor has a conflict monitor reset switch, and wherein the device has a reset switch electrically connected to the conflict monitor reset switch for remotely activating the conflict monitor reset switch.

9. The device of claim 1 wherein the plurality of switches are comprised of toggle switches.

10. The device of claim 1 wherein each of the plurality of switches corresponds to one of the plurality of traffic signals in the intersection.

11. A method of testing the operation of the components of a traffic signal control cabinet used for controlling the operation of a plurality of traffic signals in a traffic intersection, the components of the traffic signal control cabinet including a terminal panel having load switches and a flasher, a controller, and a conflict monitor, the method comprising the steps of:

disconnecting the controller from the terminal panel;

providing a portable test unit having a plurality of switching elements;

connecting the portable test unit to the terminal panel in place of the controller;

simulating an output of the controller by selectively manipulating the plurality of switching elements of the portable test unit and thereby controlling the traffic signals and the components of the traffic control cabinet; and observing the conflict monitor to verify that the conflict monitor and the other components of the control cabinet are operating properly.

12. The method of claim 11 wherein the step of simulating an output of the controller by selectively manipulating the plurality of switching elements of the portable test unit further comprises the sub-steps of:

(a) manipulating a first switching element to illuminate a first traffic signal;

(b) manipulating a second switching element to illuminate a second traffic signal which conflicts with the first traffic signal.

13. The method of claim 12 further comprising the step of manipulating a third switching element to illuminate a third traffic signal which is in conflict with the first traffic signal.

14. The method of claim 13 further comprising the step of individually manipulating the remaining switching elements corresponding to traffic signals that conflict with the first traffic signal.

15. The method of claim 11 wherein the portable test unit contains a reset switch electrically connected to the conflict monitor, the method further comprising the step of pressing the reset button after observing the conflict monitor to reset the conflict monitor.

16. A method of testing portions of a traffic signal control cabinet for controlling the operation of a plurality of traffic signals in a traffic intersection, the traffic signal control cabinet having a terminal panel connected to a controller and a conflict monitor, comprising the steps of:

providing a portable test unit having a plurality of switching elements;

connecting the portable test unit to the terminal panel of the traffic signal control cabinet in place of the controller;

controlling the operation of the plurality of traffic signals and the terminal panel by manipulating the plurality of switching elements of the portable test unit; and observing the conflict monitor and traffic signals to verify that the conflict monitor and other portions of the control cabinet operate properly.

17. The method of claim 16 wherein the portable test unit simulates the operation of the controller.

* * * * *